United States Patent
Smith et al.

(10) Patent No.: US 6,604,521 B2
(45) Date of Patent: Aug. 12, 2003

(54) SOLAR COLLECTOR PIPE

(76) Inventors: Travis Smith, #30 Miller Rd. P.O. Box 1941, Glenrock, WY (US) 82637; Manu Ghela, 537 S. Country Club Dr., Mesa, AZ (US) 85210

( * ) Notice: Subject to any disclaimer, the term of this patent is extended or adjusted under 35 U.S.C. 154(b) by 0 days.

(21) Appl. No.: 09/952,597

(22) Filed: Sep. 11, 2001

(65) Prior Publication Data

US 2003/0047180 A1 Mar. 13, 2003

(51) Int. Cl.[7] .................... F24J 2/05; F24J 2/18
(52) U.S. Cl. ............. 126/657; 126/651; 126/658; 126/660; 126/664; 126/692; 126/674; 126/663
(58) Field of Search ................ 126/651, 652, 126/655, 657, 660, 661, 663, 667, 668, 669, 670, 671, 672, 673, 674, 675, 692, 694, 658

(56) References Cited

U.S. PATENT DOCUMENTS

| | | | |
|---|---|---|---|
| 3,990,430 A | | 11/1976 | Robertson |
| 4,011,855 A | * | 3/1977 | Eshelman |
| 4,059,093 A | * | 11/1977 | Knowles et al. ............ 126/636 |
| 4,122,831 A | | 10/1978 | Mahdjuri |
| 4,134,392 A | * | 1/1979 | Livermore et al. ......... 126/657 |
| 4,142,514 A | * | 3/1979 | Newton ..................... 126/677 |
| 4,153,039 A | * | 5/1979 | Carroll |
| RE30,136 E | * | 11/1979 | Schriefer, Jr. |
| 4,196,720 A | * | 4/1980 | El Difrawi et al. |
| 4,198,955 A | | 4/1980 | Dorbeck |
| 4,206,747 A | * | 6/1980 | Neidermeyer |
| 4,281,641 A | * | 8/1981 | Devore |
| 4,284,068 A | * | 8/1981 | Gunderson |
| 4,311,132 A | | 1/1982 | van Kuijk |
| 4,328,792 A | * | 5/1982 | Shores |
| 4,340,035 A | * | 7/1982 | Begun ...................... 126/676 |
| 4,459,974 A | * | 7/1984 | Lang ........................ 126/683 |
| 4,505,260 A | * | 3/1985 | Metzger |
| 4,515,149 A | * | 5/1985 | Sgroi et al. ................ 126/651 |
| 4,586,489 A | * | 5/1986 | Voll et al. |

FOREIGN PATENT DOCUMENTS

| | | | | |
|---|---|---|---|---|
| CH | 612749 | * | 8/1977 | .......... 126/657 |
| CH | 000679330 | * | 1/1992 | .......... 126/692 |
| DE | 41 23 096 | * | 1/1993 | .......... 126/692 |
| DE | 43 35 914 | * | 4/1994 | .......... 126/692 |
| DE | 198 21 137 | * | 11/1999 | .......... 126/692 |
| FR | 2 304 875 | * | 10/1976 | .......... 126/694 |
| GB | 1515935 | * | 6/1978 | .......... 126/652 |
| GB | 001516262 | * | 6/1978 | .......... 126/657 |
| GB | 2 048 459 | * | 12/1980 | .......... 126/693 |
| GB | 2 079 445 | * | 1/1982 | .......... 126/692 |
| JP | 353041836 | * | 4/1978 | .......... 126/671 |
| JP | 355063351 | * | 5/1980 | .......... 126/657 |
| JP | 356037455 A | | 4/1981 | |
| JP | 356074554 | * | 6/1981 | .......... 126/692 |
| JP | 356080654 | * | 7/1981 | .......... 126/692 |
| JP | 357077857 | * | 5/1982 | .......... 126/651 |
| JP | 2001-221514 | * | 8/2001 | .......... 126/692 |
| SU | 001772540 A1 | | 10/1992 | |
| WO | WO 92/14103 | * | 8/1992 | .......... 126/653 |

* cited by examiner

*Primary Examiner*—Carl D. Price
(74) *Attorney, Agent, or Firm*—Schmeiser, Olsen & Watts LLP

(57) ABSTRACT

An improved solar collector pipe that directly conveys fluid to be heated and collects and transfers solar energy efficiently and directly to the internal fluid, thereby maximizing both the amount of energy transmitted to the internal fluid and the peak temperature attainable by that fluid. The solar collector pipe includes a transparent portion for admitting solar energy into the solar collector pipe. Internal to the solar collector pipe is an absorbing portion for absorbing solar energy. A conduit portion is also included and comprises a reflecting surface thereon for reflecting solar energy received through the transparent portion onto the absorbing portion. The transparent portion, the conduit portion, and the absorbing portion together define at least one fluid passageway for conveying the fluid.

43 Claims, 9 Drawing Sheets

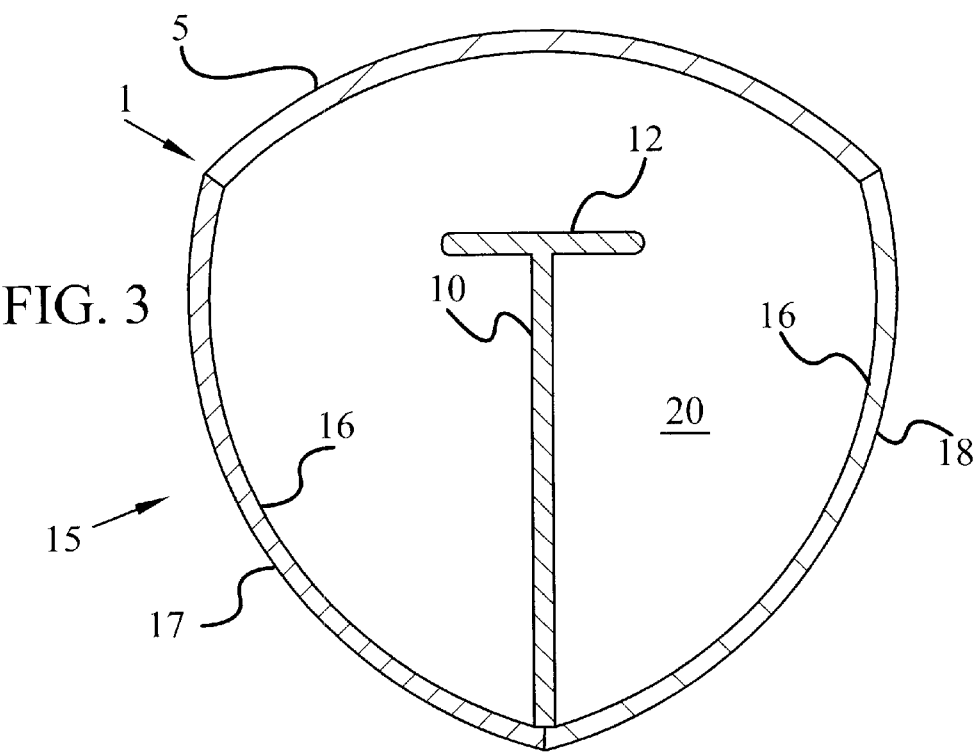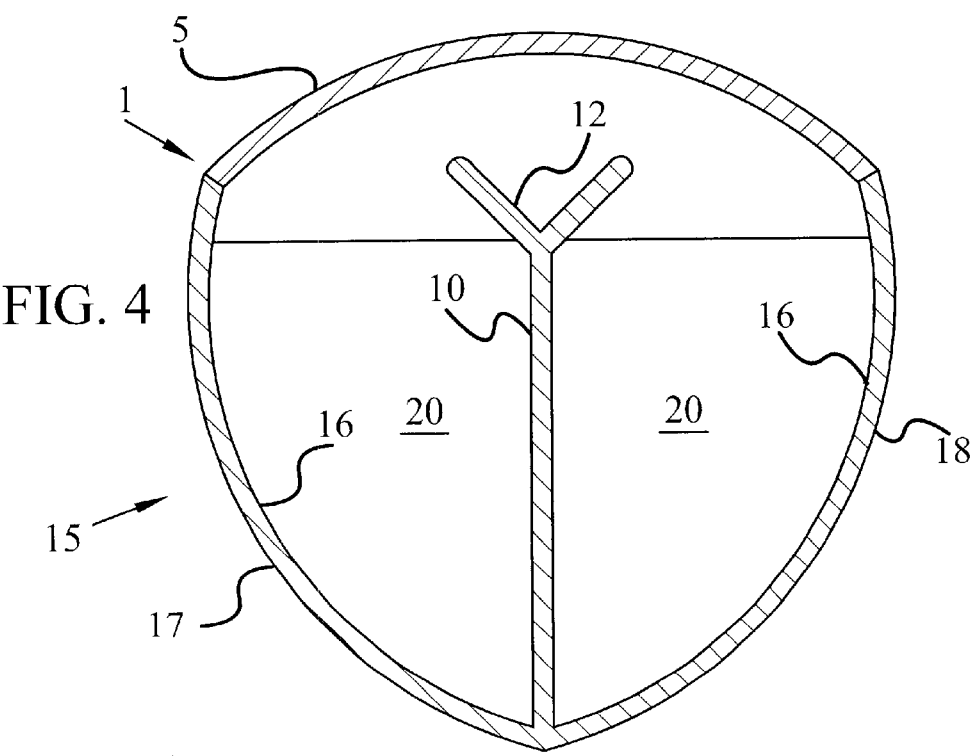

SOLAR COLLECTOR PIPE

BACKGROUND OF INVENTION

1. Technical Field

This invention relates to the field of solar energy collection, and more specifically, to a solar collector pipe.

2. Background Art

With the increasing cost of conventional fuel and energy for heating and cooling, much attention has been directed to the possibility of the use of sunlight as a source of energy for heating. Assorted solar water heating systems have previously been provided. For example, some conventional solar water heating systems involve a box which uses a transparent glass plate as a top surface of the box. Inside the box, a plurality of round black PVC pipes are placed in a snake-like pattern, back and forth through the box. Other conventional solar water heating systems involve a water-containing, round, black tube heated by solar radiation in the center of a space defined by a solar energy collector.

Both of these types of conventional solar water heating systems are placed in a location exposed to the sun, such as on the roof of a home, and water pipes, such as for a back-yard pool, are attached to either end of the round pipe network. When the sun shines down through the glass on the top of the box or through the solar energy collector, heat energy is absorbed by the black pipes inside the box or collector. The heat energy is then transmitted to the water flowing inside the pipes, thereby eventually heating the water.

These conventional solar water heating systems, however, have certain drawbacks. Conventional systems are inefficient in energy collection. That is, they do not collect and transfer solar energy efficiently and directly to the water. Thus, whatever form the solar energy absorbing element may take (e.g. black, water-containing tube), it is inherently inefficient and is continually losing a significant portion of the absorbed energy by the well known mechanisms of convection, conduction and radiation. The interaction of these heat loss mechanisms limits both the amount of energy transmitted by the absorber to the internal adjacent fluid and the peak temperature attainable by that fluid.

Conventional systems are also expensive to manufacture and difficult to install, requiring a substantial amount of labor on site during installation, thereby resulting in a system which is difficult and expensive to maintain. For example, conventional pipe and box systems are inordinately large (i.e. 12 ft.×24 ft.×8 in.), often covering significant portions of the structure being heated, and are expensive (i.e. $6000–$10,000). The size of the box presents a variety of problems. A significant amount of space must be provided to house such components. Furthermore, since such components are generally relatively heavy, the supporting structure must often be strengthened in some way to accommodate the excess weight of the components involved.

In an effort to overcome these size disadvantages, other types of solar energy collector systems have been developed which attempt to eliminate the need for large flat pipe and box systems of the type previously described. These solar energy collector systems, however, while often reduced in size, generally involve a combination of dissimilar structural elements which are often costly and complex. This also leads to many of the disadvantages previously described in conjunction with the large flat pipe and box systems.

DISCLOSURE OF INVENTION

Therefore, what is needed is a highly efficient solar collector which is easy to manufacture and assemble, is easy to maintain and replace damaged components, and is structured of inexpensive materials, thereby overcoming the aforementioned disadvantages of conventional solar heating systems. The invention solves these problems through a solar collector pipe that directly conveys fluid to be heated and collects and transfers solar energy efficiently and directly to the internal fluid, thereby maximizing both the amount of energy transmitted to the internal fluid and the peak temperature attainable by that fluid.

In association with one embodiment of present invention, a solar collector pipe includes a transparent portion for admitting solar energy into the solar collector pipe. Internal to the solar collector pipe is an absorbing portion for absorbing solar energy. A conduit portion is also included and comprises a reflecting surface thereon for reflecting solar energy received through the transparent portion onto the absorbing portion. The transparent portion, the conduit portion, and the absorbing portion together define at least one fluid passageway for conveying the fluid.

Accordingly, the solar collector pipe of this invention has many advantages, one of which is that it is highly efficient. That is, by providing a transparent portion and a conduit portion (with an internal reflecting surface) with certain shapes, such as parabolic shapes, solar energy is appropriately directed to the absorbing portion, especially if it is located along a vertical center axis of the solar collector pipe. Thus, fluid within the solar collector pipe may be heated directly by the solar energy transmitted through the transparent portion, as well as by reflected energy from the reflecting surface of the conduit portion and through heat transfer from the heat absorbing portion. Additionally, the solar collector pipe of the present invention is relatively inexpensive and easy to manufacture, assemble, maintain, and repair.

The foregoing and other features and advantages of the present invention will be apparent to those of ordinary skill in the art from the following more particular description of the invention, as illustrated in the accompanying drawings.

BRIEF DESCRIPTION OF DRAWINGS

The invention will hereinafter be described in conjunction with the appended drawings, where like designations denote like elements, and:

FIG. 3 is a cross-sectional end view of a solar collector pipe embodiment of the invention with a T-shaped absorbing portion;

FIG. 4 is a cross-sectional end view of a solar collector pipe embodiment of the invention with a Y-shaped absorbing portion;

DETAILED DESCRIPTION OF INVENTION

Figure 1:
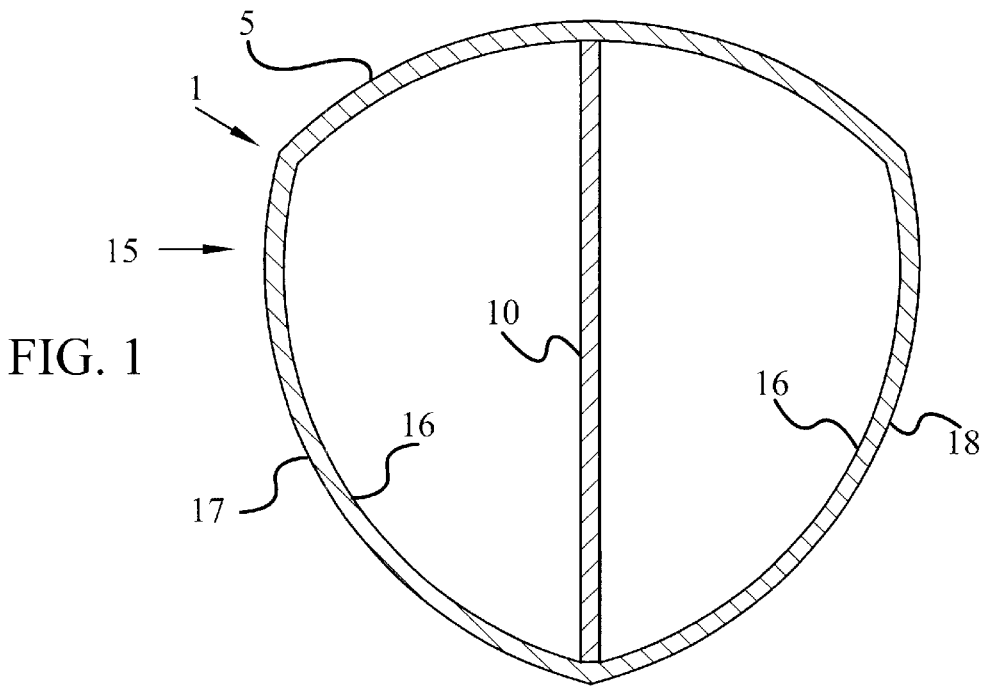
FIG. 1 is a cross-sectional end view of a solar collector pipe embodiment of the invention taken on line 1—1 of FIG. 13.

Although the present invention may be readily adapted to a variety of embodiments of a solar collector pipe, with reference to FIGS. 1–4, solar collector pipe 1 is an example of a solar collector pipe of the invention. It will be understood by one of ordinary skill in the art that the invention is not limited to the specific structures illustrated in the drawings.

Solar collector pipe 1 directly conveys internal fluid 20 to be heated and collects and transfers solar energy efficiently and directly to fluid 20, thereby maximizing both the amount of energy transmitted to fluid 20 and the peak temperature attainable by fluid 20. Solar collector pipe 1 includes transparent portion 5 for admitting solar energy into solar collector pipe 1. Absorbing portion 10 for absorbing solar energy is internal to solar collector pipe 1. Conduit portion 15 is also included and comprises reflecting surface 16 thereon for reflecting solar energy received through transparent portion 5 onto absorbing portion 10. In one embodiment, solar collector pipe 1 has an overall size of approximately a 4" height by a 4" width. However, other embodiments of solar collector pipe 1 comprise many other smaller and larger sizes depending upon the particular application, and the individual components of solar collector pipe 1 may be any size as well.

Transparent portion 5 may be any shape, but for particular embodiments of the invention forms one of an arc shape, a cambered shape, a parabolic shape, a catenary shape, and a semi-elliptical shape in cross-section. As depicted in FIGS. 1–4 and for the exemplary purposes of this disclosure, transparent portion 5 has a cambered shape in cross-section.

Figure 2:
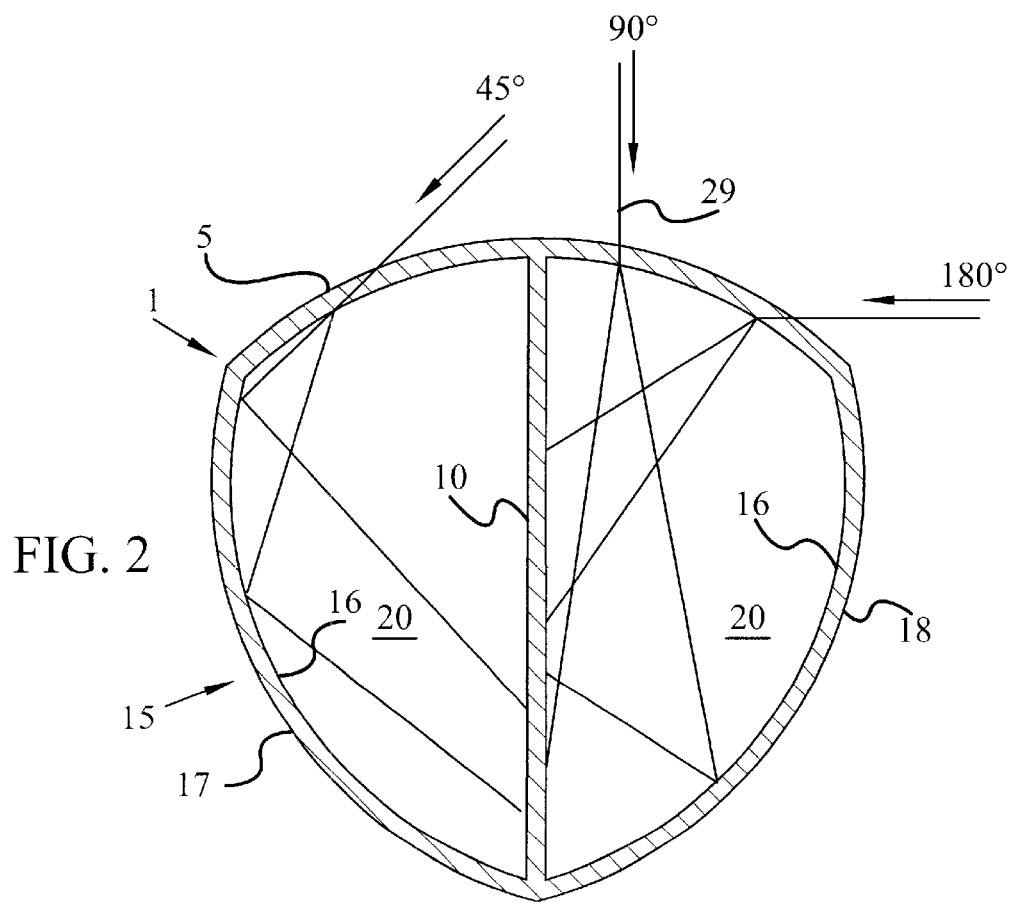
FIG. 2 is a cross-sectional end view of the solar collector pipe embodiment of FIG. 1 illustrating, for different angles of incidence to the solar collector pipe, the path of solar energy and its reverberation onto an I-shaped absorbing portion.

As depicted in FIGS. 1–2 and for the exemplary purposes of this disclosure, absorbing portion 10 is on a vertical center axis of solar collector pipe 1, wherein absorbing portion 10 is substantially vertical and forms an I-shape. A lower portion of absorbing portion 10 contacts reflecting surface 16 and upper portion 12 of absorbing portion 10 contacts transparent portion 5.

Notwithstanding the foregoing, there are many other embodiments of absorbing portion 10. In some embodiments, absorbing portion 10 is located anywhere in solar collector pipe 1 that is conducive to receiving solar radiation, and therefore, is not limited to being located on a vertical center axis of solar collector pipe 1. Moreover, in another embodiment, absorbing portion 10 comprises a plurality of absorbing portions. Upper portion 12 of absorbing portion 10 forms a T-shape and a Y-shape in the embodiments depicted in FIGS. 3–4 respectively. Even so, upper portion 12, or for that matter absorbing portion 10 itself, may be any other shape as well that is conducive to receiving solar radiation. Additionally, upper portion 12 of absorbing portion 10 does not contact transparent portion 5 in the embodiments depicted in FIGS. 3–4, but in other embodiments it does.

Conduit portion 15 comprises opposing wall portions 17 and 18 on either side of a vertical center axis of solar collector pipe 1 and a reflecting surface 16 thereon. Conduit portion 15 may be any shape, but in particular embodiments of the invention opposing wall portions 17 and 18 together form one of an ogive shape, a dropped ogive shape, an equilateral ogive shape, a lancet ogive shape, and an arc shape in cross-section. As depicted in FIGS. 1–4 and for the exemplary purposes of this disclosure, conduit portion 15 has a dropped ogive shape in cross-section.

Reflecting surface 16 may be integral or unitary with conduit portion 15. Alternatively, reflecting surface 16 may be integrally joined to conduit portion 15 and comprise the inside or outside surface of conduit portion 15, or reflecting surface 16 may be coupled to the inside or outside surface of conduit portion 15. Thus, conduit portion 15 may comprise an inside, integral, or outside reflecting surface.

Figure 5:
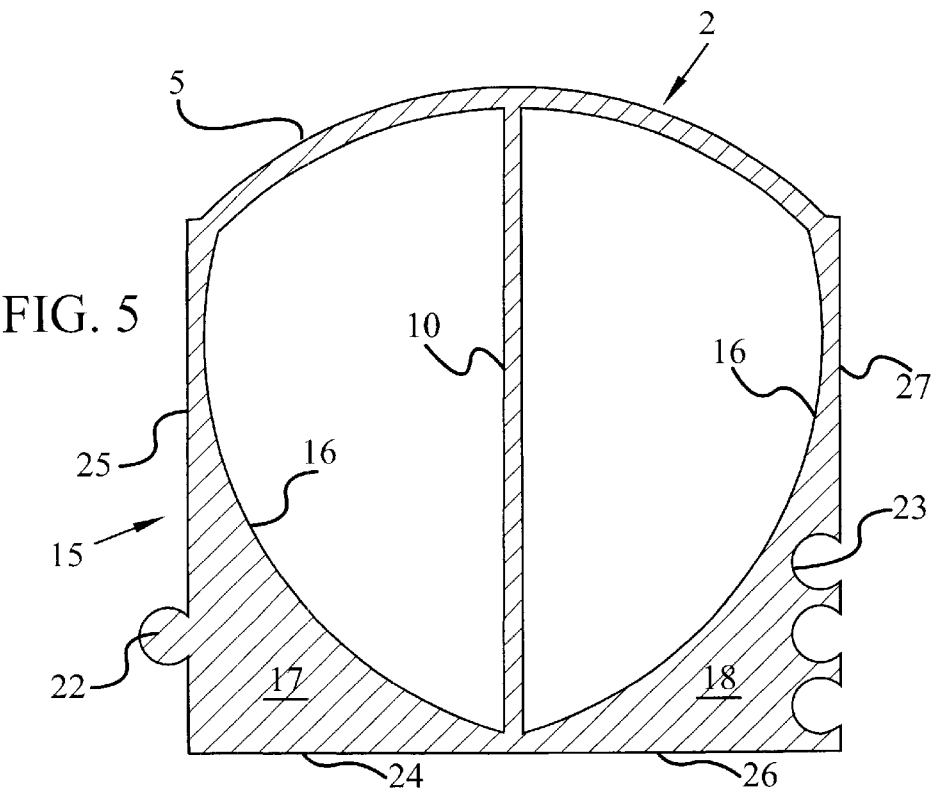
FIG. 5 is a cross-sectional end view of another solar collector pipe embodiment of the invention with a locking tab configuration.

As depicted in the square or rectangular base embodiment of conduit portion 15 in FIG. 5, opposing wall portion 17 comprises locking tab 22 that protrudes outwardly from adjoining surface 25 of opposing wall portion 17, as well as base surface 24. Opposing wall portion 18 comprises base surface 26 and adjoining surface 27, wherein adjoining surface 27 defines at least one opposing tab slot 23 positioned inwardly therein. Adjoining surface 25 and base surface 24, and adjoining surface 27 and base surface 26, each respectively form a right angle such that the square or rectangular base embodiment of conduit portion 15 may sit flat on a structure. Alternatively, angled bases may be used to accommodate angled structures. Locking tab 22, tab slot 23, adjoining surfaces 25 and 27, and base surfaces 24 and 25 may extend along the entire length of solar collector pipe 1, or may alternatively form a series of distinct sections located at select locations along the entire length of solar collector pipe 1. Notwithstanding, these components, whether extending along the entire length of solar collector pipe 1 or in a series of distinct sections, may either be integrally joined with opposing wall portions 17 and 18 as in FIG. 5, or coupled thereto.

At least one opposing tab slot 23 is configured to receive locking tab 23 of an opposing wall portion of a different solar collector pipe in removable engagement such that the adjoining surfaces of each solar collector pipe abut against at least portions of one another. However, as specifically depicted in FIG. 5, at least one opposing tab slot 23 may comprise a plurality of tab slots 23, each of which is configured to receive locking tab 23 of an opposing wall portion of a different solar collector pipe in removable engagement such that the different solar collector pipe may be positioned to account for a plurality of structural angles. Additionally, opposing wall portions 17 and 18 may be formed of any of many different types of insulative materials that eliminate conduction and convection heat losses, such as hardened foam. Alternatively, opposing wall portions 17 and 18 may each define an internal space therein that may be filled with insulative materials, such as hardened foam.

Transparent portion 5 may be formed of any of many different types of solar radiation-transmissive materials, such as glass and transparent composites, polymers, polycarbonates, polystyrenes, or other plastic materials known in the art for example. Absorbing portion 10 may be formed of any of many different types of solar energy absorbing materials, such as dark or black: glass, composites, polymers, polycarbonates, polystyrenes or other plastic materials known in the art, or vitreous ceramic materials formed of clay and various fluxes for example. Alternatively, absorbing portion 10 may have a dark or black coating layer thereon, such as chrome black. Conduit portion 15 may be formed of any of many different types of fluid conveying materials that can readily be formed into shaped objects, such as composites, polymers, polycarbonates, polystyrenes or other plastic materials known in the art for example, vitreous ceramic materials formed of clay and various fluxes, metals, such as corrosion-resistant metals like zinc or magnesium, or alloys, such as aluminum. Reflecting surface 16 may be formed of any of many different types of solar energy reflecting materials, such as Al, Cu, Pb, Ag, or Au for example. Reflecting surface 16 may be formed by a curved, polished sheet or flexible foil of such materials which is formed on the inside or outside surface of conduit portion 15, or may be a layer or coating of such materials on the inside or outside surface of conduit portion 15. Alternatively, the materials forming reflecting surface 16 may be integrally mixed with the materials forming conduit portion 15.

The components defining any solar collector pipe embodiment of the invention may be manufactured separately and then assembled together. However, the components may be manufactured simultaneously and integrally joined with one another. Manufacture of these components separately or simultaneously may involve either extrusion, injection molding, casting, milling, or the like. If any of the components are manufactured separately, they may then be sealingly coupled with one another in any manner known in the art, such as with adhesive or a weld for example, depending on, among other considerations, the particular material forming the components. Accordingly, as depicted in the embodiment of FIGS. 1–2, transparent portion 5 is integrally joined to conduit portion 15. Nevertheless, as depicted in the embodiment of FIG. 3, transparent portion 5 and opposing wall portions 17 and 18 of conduit portion 15 are distinct portions sealingly coupled together. Alternatively and as depicted in the embodiment of FIG. 4, transparent portion 5 and conduit portion 15 are distinct portions sealingly coupled together. Referring to the embodiment depicted in FIG. 2, absorbing portion 10 is integrally joined to transparent portion 5 and conduit portion 15, while in the embodiment depicted in FIG. 4, absorbing portion 10 is integrally joined to only conduit portion 15. However, absorbing portion 10 is sealingly coupled to transparent portion 5 and conduit portion 15 in the embodiment depicted in FIG. 1, while absorbing portion 10 is sealingly coupled to only conduit portion 15 in the embodiment depicted in FIG. 3. Alternatively, absorbing portion 10 may be an insert in solar collector pipe 1. For example, absorbing portion 10 may be coupled into opposing grooves located internal to solar collector pipe 1 on conduit portion 15 and transparent portion 5 in a tongue and groove arrangement.

The solar collector pipe embodiments of the present invention provide for an improved and highly efficient process of heating fluid 20. This process includes conveying fluid 20 to be heated through a solar collector pipe of the present invention configured to admit solar energy to fluid 20 through transparent portion 5. Fluid 20 conveyed within solar collector pipe 1 may be any desired heat retaining fluid, such as, for example, air, water, oil, gel, a food-grade antifreeze mixture or any combination of such fluids. Thus, as fluid 20 to be heated is conveyed through solar collector pipe, fluid 20 may be in direct contact with at least a portion of absorbing portion 10 and at least a portion of reflective surface 16 if reflecting surface 16 is integral with or coupled to an inside surface of conduit portion 15 as previously described. Alternatively, fluid 20 may be in direct contact with at least a portion of absorbing portion 10 and at least a portion of conduit portion 15 if reflecting surface 16 is coupled to an outside surface of conduit portion 15 as previously described. As solar energy is then admitted into solar collector pipe 1 through transparent portion 5, fluid 20 is heated in any two of a direct manner, a direct reflective manner, and a conductive manner.

More specifically and for the exemplary purposes of this disclosure, internal fluid 20 is in direct contact with at least a portion of reflecting surface 16 coupled to an inside surface of conduit portion 15 and at least a portion of absorbing portion 10, as illustrated in the embodiment of FIG. 4. Notwithstanding, fluid 20 may further be in direct contact with at least a portion of transparent portion 5, or completely fill solar collector pipe 1, as depicted in FIGS. 2–3, thereby directly contacting transparent portion 5, absorbing portion 10, and reflecting surface 16. Fluid 20 is heated in a direct manner, a direct reflective manner, and a conductive manner, but typically in all three manners. Thus, solar collector pipe 1 is highly efficient in that it collects and transfers solar energy efficiently to internal fluid 20, thereby maximizing both the amount of energy transmitted to internal fluid 20 and the peak temperature attainable by fluid 20.

Turning to FIG. 2 specifically, there is indicated for different points of time of the day with associated sun's altitudes the pattern of the incident and reverberated solar energy, such as light rays 29, depicted in FIG. 2 at 45°, 90°, and 180°. Through solar collector pipe 1, solar energy is collected over a direction range extending substantially through 180° from East to West, even if solar collector pipe 1 is in a stationary arrangement. Thus, effective collection is ensured from very early in the morning till very late in the afternoon. Moreover, during the early morning hours and the late afternoon hours, a substantial portion of the collected solar energy directly impinges on absorbing portion 10 and at an angle that is favorable for the contemplated heating. It is clear that all collected rays eventually find their way either directly or otherwise by substantially only single reverberation to absorbing portion 10 arranged along the vertical center axis of solar collector pipe 1. The directions according to which the incident or "captured" solar energy impinge on reflective surface 16 typically do not enclose an angle having the value zero to the perpendicular on reflective surface 16 at the place of incidence, so that no captured solar energy may be reverberated outwardly. Moreover, solar energy that does not directly impinge on absorbing portion 10 reaches it typically after one reverberation, which enhances the effective heating. Additionally, fluid 20 acts as a lense to refract and spread solar energy through fluid 20 and onto absorbing portion 10, again enhancing the effective heating.

Turning now to FIGS. 6–9, this invention also includes a mounting bracket for removably mounting a solar collector pipe of the invention against a structure in order to maximize exposure to solar energy by directing the solar collector pipe toward the sun on a variety of different angles and at a variety of geographic locations. Through mounting brackets of the invention, solar collector pipes of the invention are easily incorporated on roofs of all kinds of inclinations, as well as upright walls, other support structures, and the like.

For the exemplary purposes of this disclosure, mounting bracket 30 embodiments depicted in FIGS. 6–9 are configured to removably mount solar collector pipe 1. Mounting bracket 30 generally includes base 32 for removably coupling mounting bracket 30 to the structure. Opposing engaging members 34 and 35 are respectively located on either side of a vertical center axis of mounting bracket 30 and together form one of an ogive shape, a dropped ogive shape, an equilateral ogive shape, a lancet ogive shape, and an arc shape. As depicted in FIGS. 6–9 and for the exemplary purposes of this disclosure, opposing engaging members 34 and 35 together form a dropped ogive shape. Opposing engaging members and 35 are coupled to base 32 or are integrally joined therewith, and are configured to removably mount solar collector pipe 1.

Opposing engaging members 34 and 35 of mounting bracket 30 include upper retaining portions 36 and 37 respectively protruding inward towards the vertical center axis of mounting bracket 30. Upper retaining portions 36 and 37 are configured to removably retain solar collector pipe 1 when it is removably mounted by opposing engaging members 34 and 35. That is, upper retaining portions 36 and 37 snap over the edges of solar collector pipe 1 formed where opposing wall portions 17 and 18 meet with transparent portion 5. Notwithstanding the foregoing, other embodiments of the mounting bracket of the invention may not include upper retaining portions 36 and 37.

Figure 8:
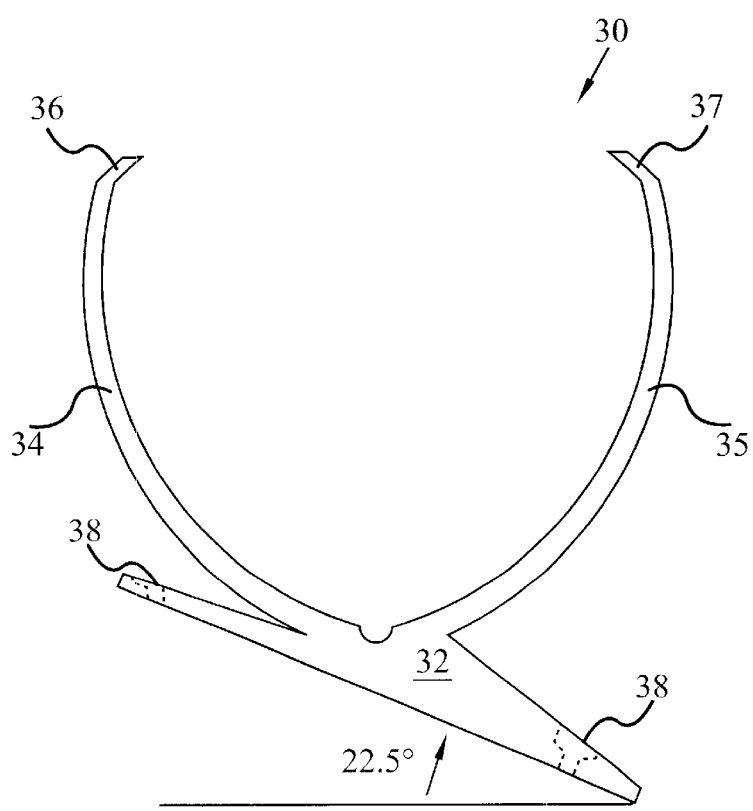
FIG. 8 is an end plan view of yet another mounting bracket embodiment of the invention similar to that of FIG. 6, but having a base positioned at a 22.5° angle.

Various embodiments of mounting brackets of the invention exist for improving the collection efficiency and/or concentration of solar energy by proper orientation of a solar collector pipe of the present invention. The solar collector pipe may operate efficiently with no required adjustment of tilt angle. Accordingly, mounting bracket 30 embodiments is of FIGS. 6, 8, and 9 mount solar collector pipe 1 in a non-tilting, vertical orientation. Base 32 of mounting bracket 30 may be positioned at any angle from a horizontal lower axis of mounting bracket 30, such as in the range of 0° to 90°, and still maintain the non-tilting, vertical orientation of solar collector pipe 1. For example, as depicted in the embodiment of FIG. 8, base 32 is positioned at 22.5° from a horizontal lower axis of mounting bracket 30. As another example, base 32 is positioned at 45° from a horizontal lower axis of mounting bracket 30 as depicted in the embodiment of FIG. 8. The base 32 angle embodiments depicted in FIGS. 8–9 reflect conventional roof inclinations.

Figure 7:
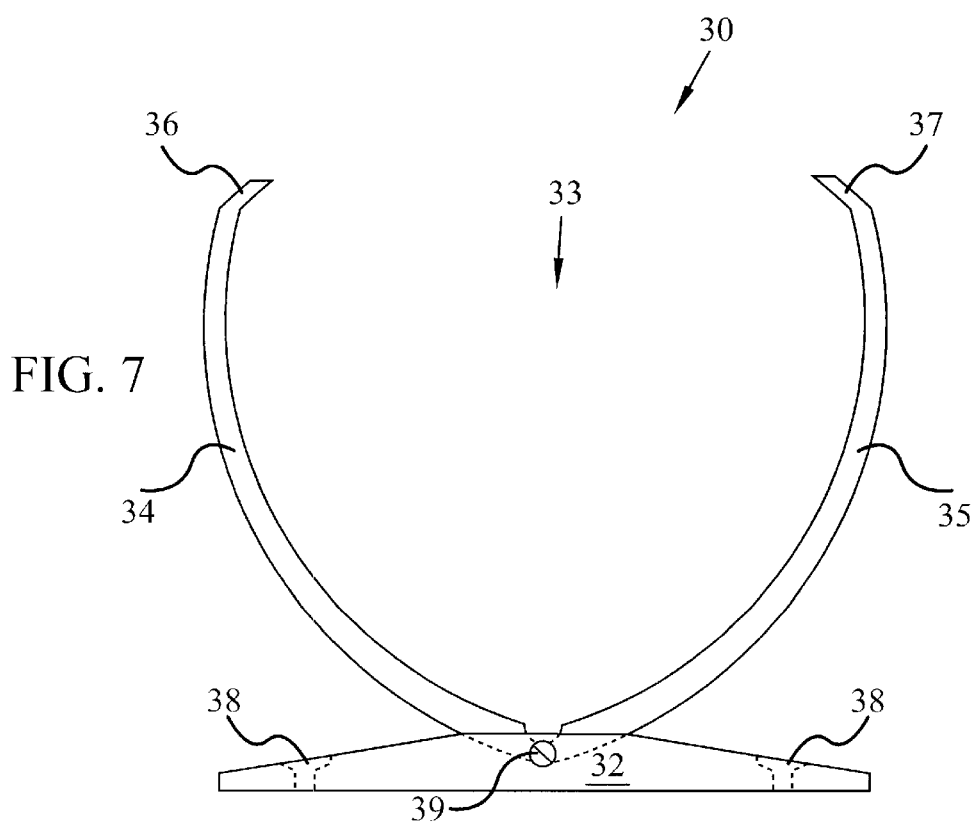
FIG. 7 is an end plan view of another mounting bracket embodiment of the invention similar to that of FIG. 6, but configured to be adjustable between a plurality of angles.
Figure 9:
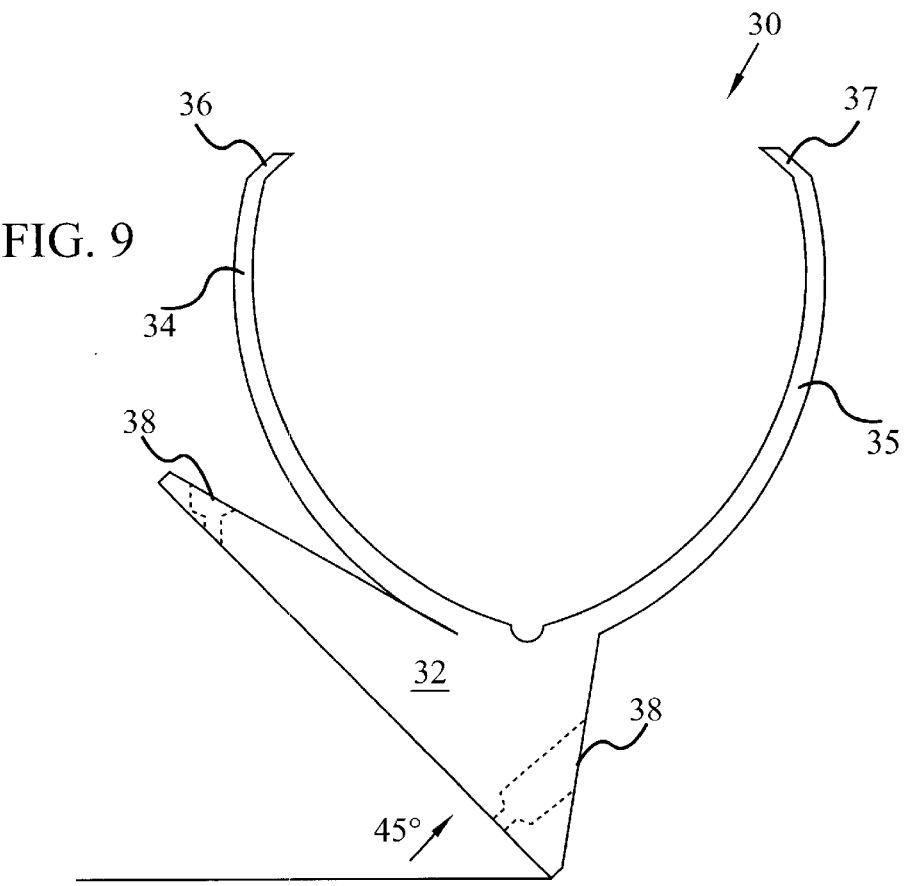
FIG. 9 is an end plan view of still another mounting bracket embodiment of the invention similar to that of FIG. 6, but having a base positioned at a 45° angle.

Alternatively, solar collector pipe 1 may be arranged movably, pivoting along with the position of the sun, with a view to an optimal incidence of solar radiation. To achieve this necessary performance, engaging members 34 and 35 of mounting bracket 30 may be integrally joined together at their lower portions, thereby forming unitary engaging member 33 as depicted in the embodiment of FIG. 7. Unitary engaging member 33 is adjustable on base 32 between a plurality of angles. In the embodiment of FIG. 7, unitary engaging member 33 pivots around fastener 39, such as a screw. That is, the vertex of unitary engaging member 33 is located in a receiving notch defined inwardly from a top surface of base 32. Fastener 39 extends through holes in base 32 and through the vertex portion of unitary engaging member 33, allowing unitary engaging member 33 to pivot to a desired angle and then to be removably secured in place. Thus, the mounting bracket 30 embodiment of FIG. 7 allows for an intermittent change of solar collector pipe 1 orientation. Notwithstanding the foregoing, unitary engaging member 33 may be continuously oriented, with the requisite sensors, controls and motor-drive mechanism.

In another embodiment of mounting bracket 30, mounting bracket 30 comprises a square or rectangular base embodiment similar to square or rectangular base embodiment of conduit portion 15 in FIG. 5. Particularly in this mounting bracket 30 embodiment, opposing engaging member 34 of FIG. 6 further comprises a locking tab protruding outwardly from an adjoining surface of opposing engaging member 34, as well as a base surface. Opposing engaging member 35 of FIG. 6 further comprises a base surface and an adjoining surface as well, wherein the adjoining surface defines at least one opposing tab slot positioned inwardly therein. Respective adjoining surfaces and base surfaces together form a right angle such that the square or rectangular base embodiment may sit flat on a structure. Alternatively, angled bases may be used to accommodate angled structures. The locking tab, the tab slot, the adjoining surfaces, and the base surfaces may either be integral with opposing engaging members 34 and 35, or coupled thereto.

The at least one opposing tab slot is configured to receive a locking tab of an opposing engaging member of a different mounting bracket in removable engagement, such that the adjoining surfaces of each mounting bracket abut against at least portions of one another. However, the at least one opposing tab slot may comprise a plurality of tab slots, each of which is configured to receive a locking tab of an opposing engaging member of a different mounting bracket in removable engagement such that the different mounting bracket may be positioned to account for a plurality of structural angles. Additionally, opposing engaging members 34 and 35 of this square or rectangular base embodiment may be formed of any of many different types of insulative materials that eliminate conduction and convection heat losses, such as hardened foam. Alternatively, opposing engaging members 34 and 35 may each define an internal space therein that may be filled with insulative materials, such as hardened foam.

Mounting brackets of the invention may be formed of any of many different types of materials that can readily be formed into shaped objects, such as composites, polymers, polycarbonates, polystyrenes or other plastic materials known in the art for example, vitreous ceramic materials formed of clay and various fluxes, metals, such as corrosion-resistant metals like zinc or magnesium, or alloys, such as aluminum, or any other material that is sufficiently resilient to allow solar collector pipe 1 to be snapped into engaging members 34 and 35 with upper retaining portions 36, yet sufficiently rigid to hold solar collector pipe 1 securely in place.

Mounting bracket components may be manufactured simultaneously and integrally joined with one another. These components may be manufactured by extrusion, injection molding, casting, milling, or the like. Mounting brackets may be cut into or form distinct sections to be placed at select locations along the entire length of solar collector pipe 1. These distinct sections may have a width of approximately 1", although they may have any smaller or larger width. Mounting brackets may then be coupled to a structure by using, for example, adhesive, a weld, a fastener (e.g. a screw, nail, bolt, etc.), or any other coupling mechanism, depending on the particular material forming mounting brackets and the material forming the structure, among other considerations. If screws are to be used, as in the embodiments depicted in FIGS. 6–9, screw holes 38 may be drilled through base 32 at any convenient angle and location therein.

Figure 12:
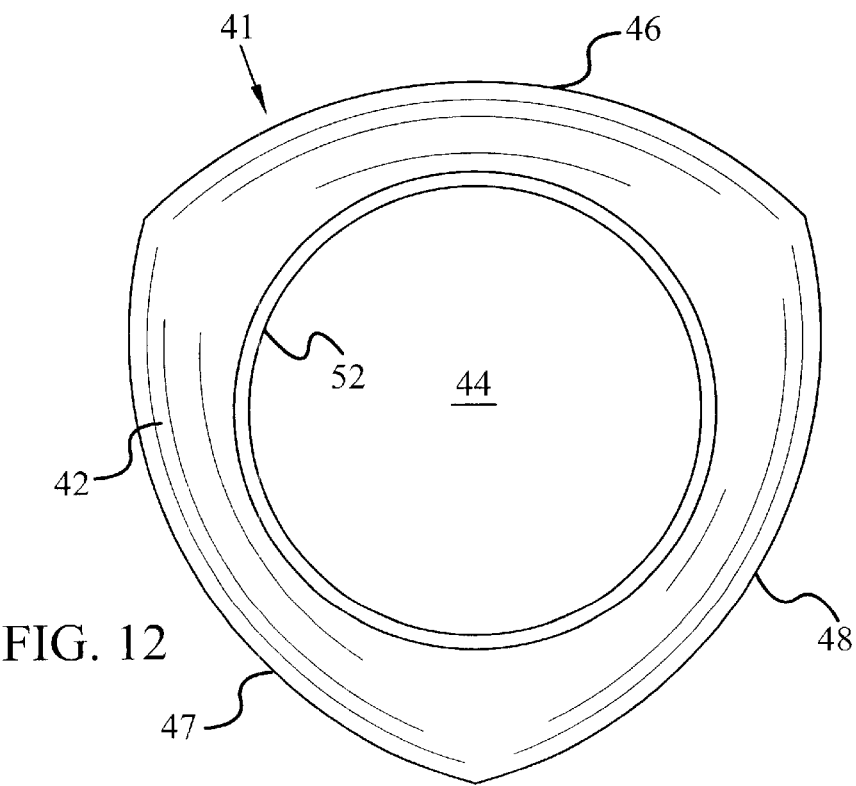
FIG. 12 is an end plan view of another pipe connector embodiment of the invention configured to connect a solar collector pipe embodiment of the invention with a cylindrical pipe.
Figure 6:
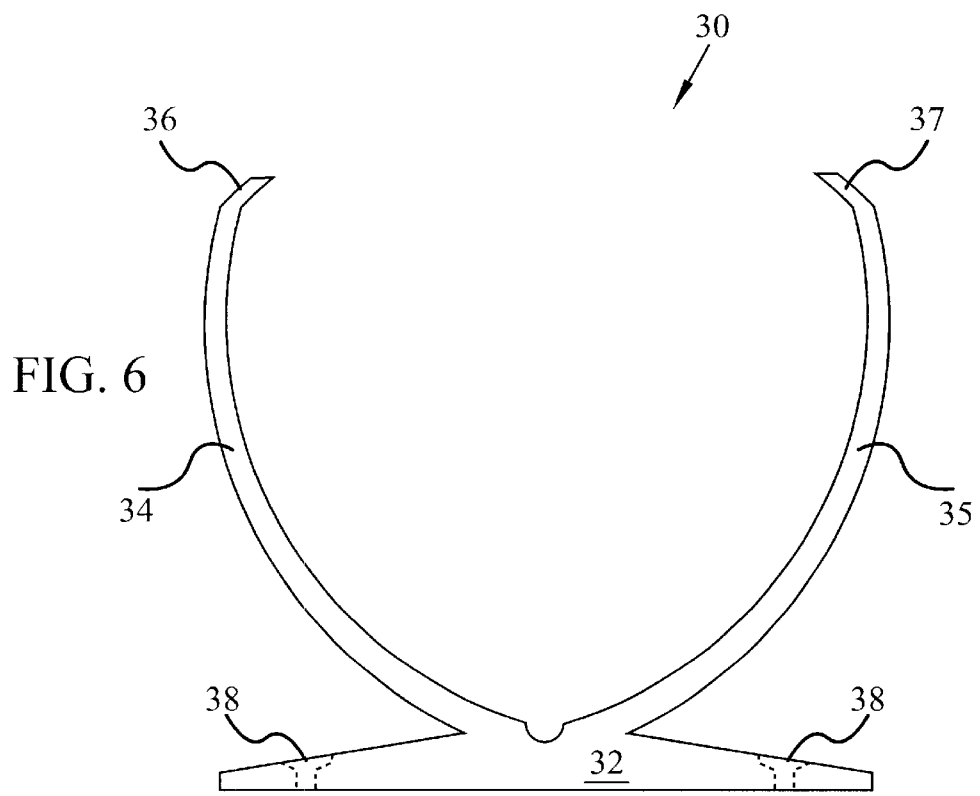
FIG. 6 is an end plan view of a mounting bracket embodiment of the invention that is configured to removably mount a solar collector pipe configured according to an embodiment of the invention.
Figure 10:
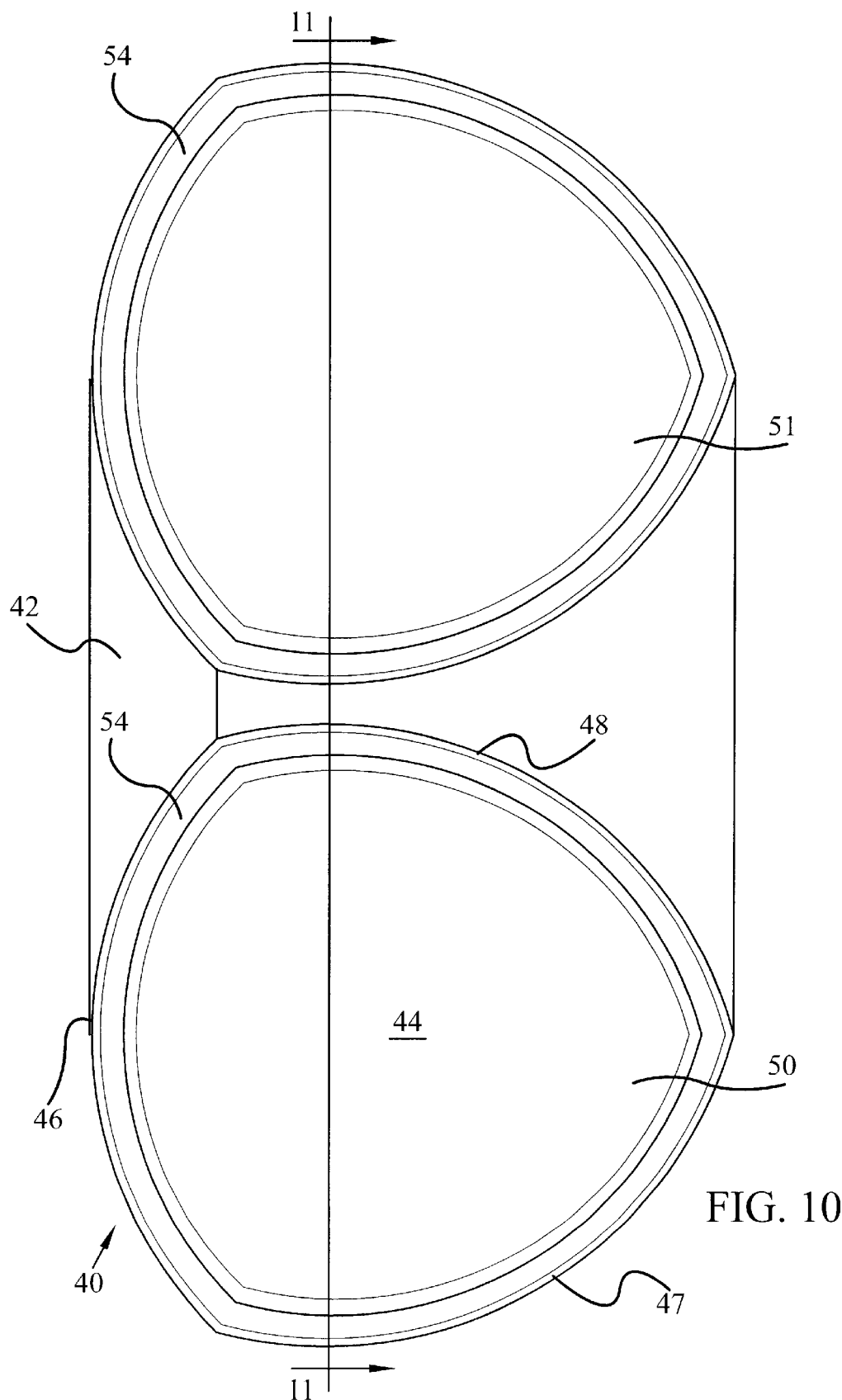
FIG. 10 is a front end plan view of a pipe connector embodiment of the invention configured to mate with two solar collector pipes configured according to embodiments of the invention.

This invention also includes a pipe connector for use with solar collector pipes of the invention. Turning now to FIGS. 10–13, pipe connector embodiments 40, 41, and 43, as well as other pipe connector embodiments, generally include a pipe connector body 42 that comprises at least one internal bore 44 therethrough, and three wall portions 46, 47, and 48. Wall portion 46 forms one of an arc shape, a cambered shape, a parabolic shape, a catenary shape, and a semi-elliptical shape. As depicted in FIGS. 10 and 12 and for the exemplary purposes of this disclosure, wall portion 46 has a cambered shape. Wall portions 47 and 48 oppose one another on either side of a vertical center axis of the pipe connector and together form one of an ogive shape, a dropped ogive shape, an equilateral ogive shape, a lancet ogive shape, and an arc shape. As depicted in FIGS. 10 and 12 and for the exemplary purposes of this disclosure, wall portions 47 and 48 together have a dropped ogive shape. At least two openings are also included for inlet of fluid into and outlet of fluid out of body 42, wherein at least one of the at least two openings is configured to mate with a solar collector pipe of the invention. However, the at least two openings may be configured to mate with solar collector pipes of the invention, such as in pipe connector embodiments 40 and 43 of FIGS. 10, 11, and 13, wherein openings 50 and 51 are each configured to mate with a solar collector pipe 1.

Figure 11:
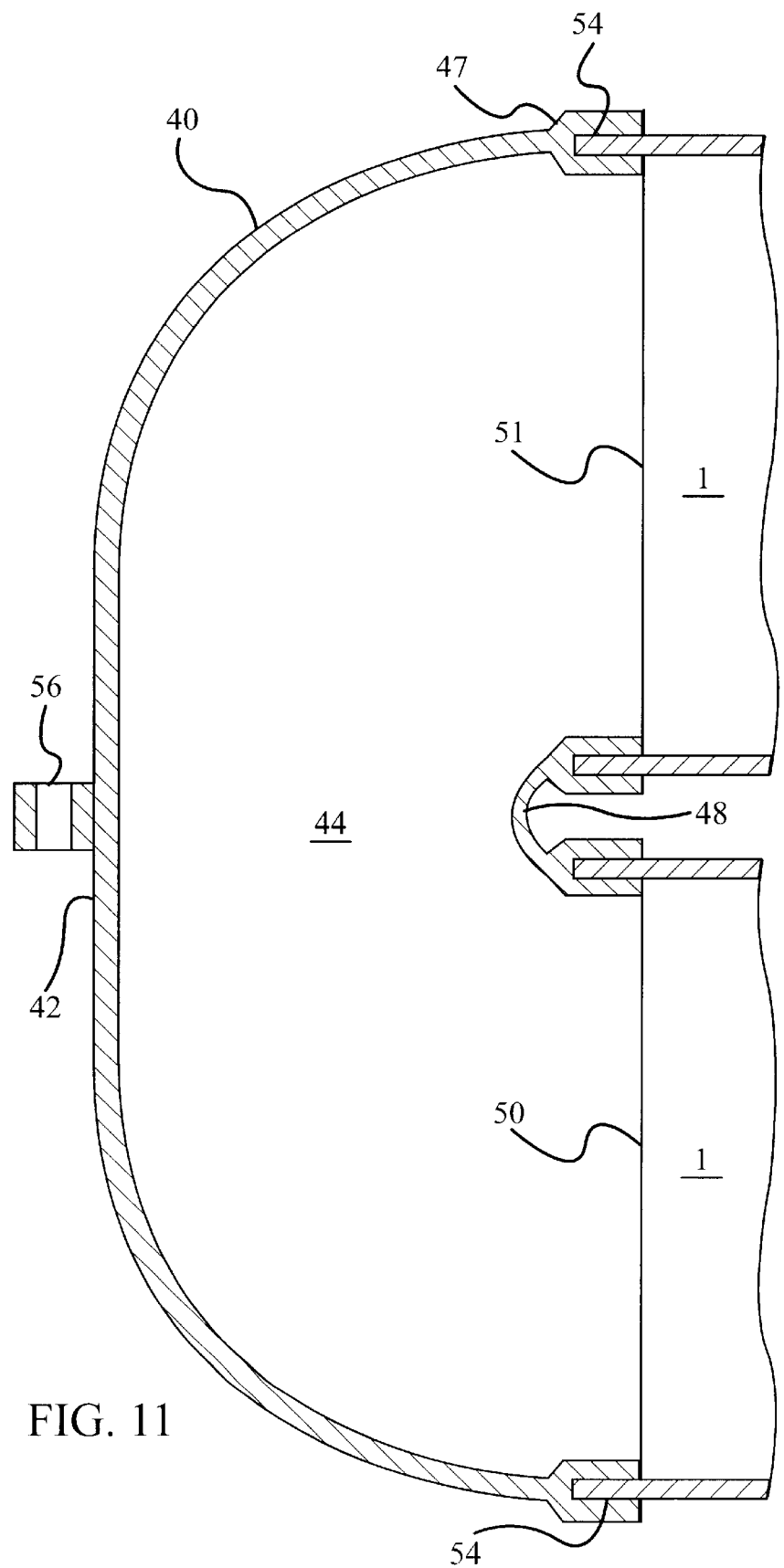
FIG. 11 is a cross-sectional view of the pipe connector embodiment of FIG. 10 taken on line 11—11 of FIG. 10 illustrating a tongue and groove arrangement of mating the pipe connector and the two solar collector pipes configured according to an embodiment of the invention.

Referring to FIGS. 10–11 particularly, a 180° end-to-end pipe connector embodiment 40 is depicted. Pipe connector 40 includes a pipe connector body 42 that comprises internal bore 44 therethrough and three wall portions 46, 47, and 48. Wall portion 46 forms a cambered shape. Wall portions 47 and 48 oppose one another on either side of a vertical center axis of pipe connector 40 and together form a dropped ogive shape. Two openings 50 and 51 are also included for inlet of fluid into and outlet of fluid out of body 42, and openings 50 and 51 are each configured to mate with an end of a solar collector pipe 1 in a tongue and groove arrangement. Specifically, wall portions 46, 47, and 48 define grooves 54 positioned inwardly therein at openings 50 and 51. As depicted in FIG. 11, ends of two solar collector pipes 1 are positioned into grooves 54 at openings 50 and 51. Alternatively, pipe connector 40 may comprise protrusion 56 coupled on or integrally joined with a back end of pipe connector 40 that is configured to removably mount pipe connector 40 against a structure.

Notwithstanding the foregoing, in other pipe connector embodiments of the present invention, body 42 may form an angular shape in the range of 0° (e.g., pipe connector 43 in FIG. 13) to 180° (e.g., pipe connector 40 in FIGS. 10–11). However, body 42 may form other shapes as well. For example, in one embodiment, the connector body 42 forms a T-shape, wherein at least one internal bore 44 branches into two internal bores in fluid flow communication with each other with three openings. In another exemplary embodiment, the connector body 42 forms a Y shape, wherein at least one internal bore 44 branches into three internal bores in fluid flow communication with each other with three openings. Additionally, the at least one of the at least two openings may be configured to mate with an end of solar collector pipe 1 in any other arrangement, such as in an arm and sleeve arrangement. That is, the at least one of the at least two openings may form a sleeve for receiving an end of solar collector pipe 1 inserted therein. For example, as depicted in pipe connector embodiment 41 of FIG. 12, opening 52 forms a cylindrical sleeve for receiving an end of a cylindrical pipe inserted therein.

Pipe connector embodiments 40, 41, and 43, as well as other pipe connector embodiments, may be formed of any of many different types of materials that can readily be formed into shaped objects, such as composites, polymers, polycarbonates, polystyrenes or other plastic materials known in the art for example, vitreous ceramic materials formed of clay and various fluxes, metals, such as corrosion-resistant metals like zinc or magnesium, or alloys, such as aluminum, or any other material fluid conveying material.

The components defining pipe connector embodiments 40, 41, and 43, as well as other pipe connector embodiments, may be manufactured separately and then assembled together, or may be manufactured simultaneously and integrally joined with one another. Manufacture of these components separately or simultaneously starts with either extrusion, injection molding, casting, milling, or the like. If any of the components are manufactured separately, they may then be sealingly coupled with one another in any manner known in the art, such as with an adhesive or a weld for example, depending on, among other considerations, the particular material forming the components.

The solar collector pipe according to the invention may additionally be incorporated in a solar energy collection system and embodiments thereof. Although the present invention may be readily adapted to a variety of embodiments of a solar energy collection system, with reference to FIGS. 13–14, solar energy collection system 60 is an example of a solar energy collection system of the invention. Solar energy collection system 60 generally includes at least two solar collector pipes 1 in fluid flow communication with one another for conveying fluid to be heated and for removing heated fluid, although the at least two solar collector pipes may comprise a plurality of solar collector pipes 1. Heated fluid from solar energy collection system 60, such as heated air or hot water, may be then used for conditioning the air in a living space, providing hot water for domestic use over a wide range of ambient conditions, heating other bodies of fluid such as the water in a swimming pool, or the like.

Solar collector pipe 1 has previously been described. As such, the at least two solar collector pipes 1 of solar energy collection system 60 each generally comprise: transparent portion 5 for admitting solar energy therethrough; absorbing portion 10 therein for absorbing solar energy; and conduit portion 15 comprising reflecting surface 16 thereon for reflecting solar energy received through the transparent portion onto the absorbing portion. Transparent portion 5, conduit portion 15, and absorbing portion 10 together define at least one fluid passageway for conveying the fluid.

Notwithstanding the foregoing, in an alternative embodiment of a solar energy collection system of the invention, a plurality of solar collector pipes 1 are joined together in a fixed immovable relationship to each other in a unitary body. The unitary solar energy collection system may be used in any application that solar energy collection system 60 may be used in as previously or hereinafter described. Each solar collector pipe 1 in each unitary body comprises transparent portion 5, absorbing portion 10, and conduit portion 15 similar to the components of solar energy collection system 60 as previously described. For each unitary body, the joined solar collector pipes 1 are comprised of an integrally formed lower member formed of conduit portions 15 and an integrally formed top member formed of cover portions 5.

The top member and lower member defining a unitary body may be manufactured separately and then assembled together, or may be manufactured simultaneously and integrally joined with one another. Manufacture of these components separately or simultaneously may include any of extrusion, injection molding, casting, milling, or the like. If the components are manufactured separately, they may then be sealingly coupled with one another in any manner known in the art, such as with an adhesive or a weld for example, depending on, among other considerations, the particular material forming the components.

Solar energy collection system 60 may further comprise at least one mounting bracket 30, as previously described, for removably mounting the at least two solar collector pipes 1 of solar energy collection system 60 against a structure. As such, at least one mounting bracket 30 may be positioned at one of a 22.5° angle and a 45° angle from a horizontal lower axis of at least one mounting bracket 30 for example. At least one mounting bracket 30 may also be adjustable between a plurality of angles as another example.

Solar energy collection system 60 may still further comprise at least one pipe connector, such as pipe connector embodiments 40, 41, and 43, as well as other pipe connector embodiments, as previously described. Accordingly, the at least one pipe connector may connect at least two solar collector pipes 1 of solar energy collection system 60 together in fluid flow communication (e.g., pipe connectors 40 and 43 of FIG. 13). Moreover, the at least one pipe connector may connect one of at least two solar collector pipes 1 of solar energy collection system 60 together with cylindrical pipe 62 or 64 in fluid flow communication (e.g., pipe connector 41 of FIG. 13).

Solar energy collection system 60 may yet further comprise a heating system coupled thereto in fluid flow communication. The heating system is for utilizing heated fluid from solar energy collection system 60 in order to heat an area, such as a room within a structure, a pool, or the like. Solar energy collection system 60 concerns any known embodiments of heating system installations for utilizing the solar heated fluid generated.

Accordingly, the heating system may include a thermal storage device for storing heated fluid from solar energy collection system 60, such as a hot water heater tank, gas water tank, insulated tank, or the like. The thermal storage device is coupled directly or indirectly with the heating system and solar energy collection system 60 in fluid flow communication. The heating system may also include a pump for circulating fluid through solar energy collection system 60 and the heating system. The pump is coupled with the heating system and solar energy collection system 60 in fluid flow communication, and may be any pump for circulating fluid, such as a pool pump, a heat pump, an in-line purge pump for a radiant floor heating system, a sensor-controlled pump, or the like. The heating system may also include a heat circulation system within the area to be heated coupled with the heating system in fluid flow communication. Such a heat circulation system may be radiant floor heating (or Hydronic) tubes embedded in the flooring of a structure, air ducts, or the like.

For some installations, it is most convenient to store the heated fluid in an insulated tank at ground level, rather than at roof-top level. Therefore it becomes convenient to use a sensor-controlled fluid pump to circulate the heat-exchange fluid appropriately. Many standard, simple circuits exist for comparing the fluid temperatures in the tank and solar energy collection system 60, and causing the pump to act only when it is beneficial for it to do so. Particular advantages of this program are evident for the retrofitting of solar energy collection system 60 to an existing hot water system. Embodiments of the present invention do not require a new hot-water tank, and they permit the use of the existing gas or electric system as backup without extensive modification. The ability of the sensor-controlled pump, combined with solar energy collection system 60, to produce and store hotter water than that available from a conventional flat-plate collector, permits a solar hot-water system to use a smaller hot water storage tank than is normally recommended.

Figure 13:
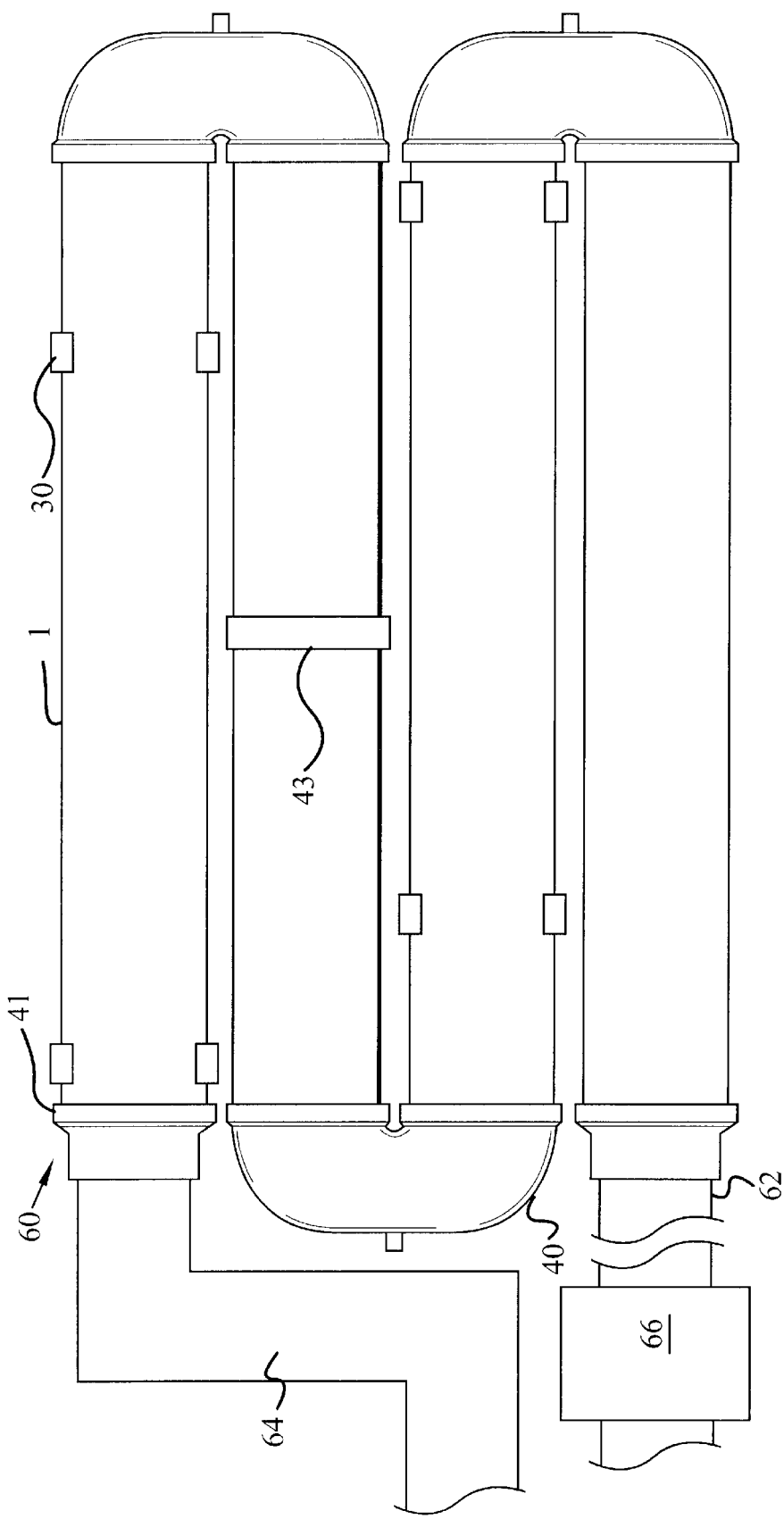
FIG. 13 is a top plan view of a solar energy collection system embodiment of the invention in conjunction with a pump.

In the installation in FIG. 13, solar energy collection system 60 may couple to both inlet pipe 62 and outlet pipe 64, which in turn couple to a heat circulation system, such as a radiant floor heating installation (not shown) for example. Pump 66 is depicted as coupled with inlet pipe 62, but could also be coupled to outlet pipe 64. Pump 66 circulates the fluid (heated water or a food-grade antifreeze mixture) to be heated in solar energy collection system 60 through the embedded tubing, thereby warming the thermal mass of the concrete and heating the area from the floor up.

Still referring to FIG. 13 and as an alternative radiant floor heating installation, heated fluid from solar energy collection system 60 may flow through the embedded tubing via thermosiphon, thereby warming the thermal mass of the concrete and heating the area from the floor up. Thermosiphon is a natural flow of water that results from water being heated and allowed to rise convectively as part of a circulation plan in a closed-loop radiant floor heating system. For example, water heated in solar energy collection system 60 will naturally want to rise, effectively both pushing and pulling at cooler water in a circulation pattern, thereby moving heated water from solar energy collection system 60 to the tubing for use. However, a heating and circulation system designed to use solar-heated water that circulates by thermosiphon is susceptible to blockage by air bubbles. Accordingly, pump 66 may be a small in-line pump used for purging and clearing the blockage. In this embodiment, pump 66 will circulate water through the tubing fast enough to dislodge an air bubble. Typically, purge pump 66 only comes on when the system stagnates, and when circulation is restored, pump 66 shuts off.

Figure 14:
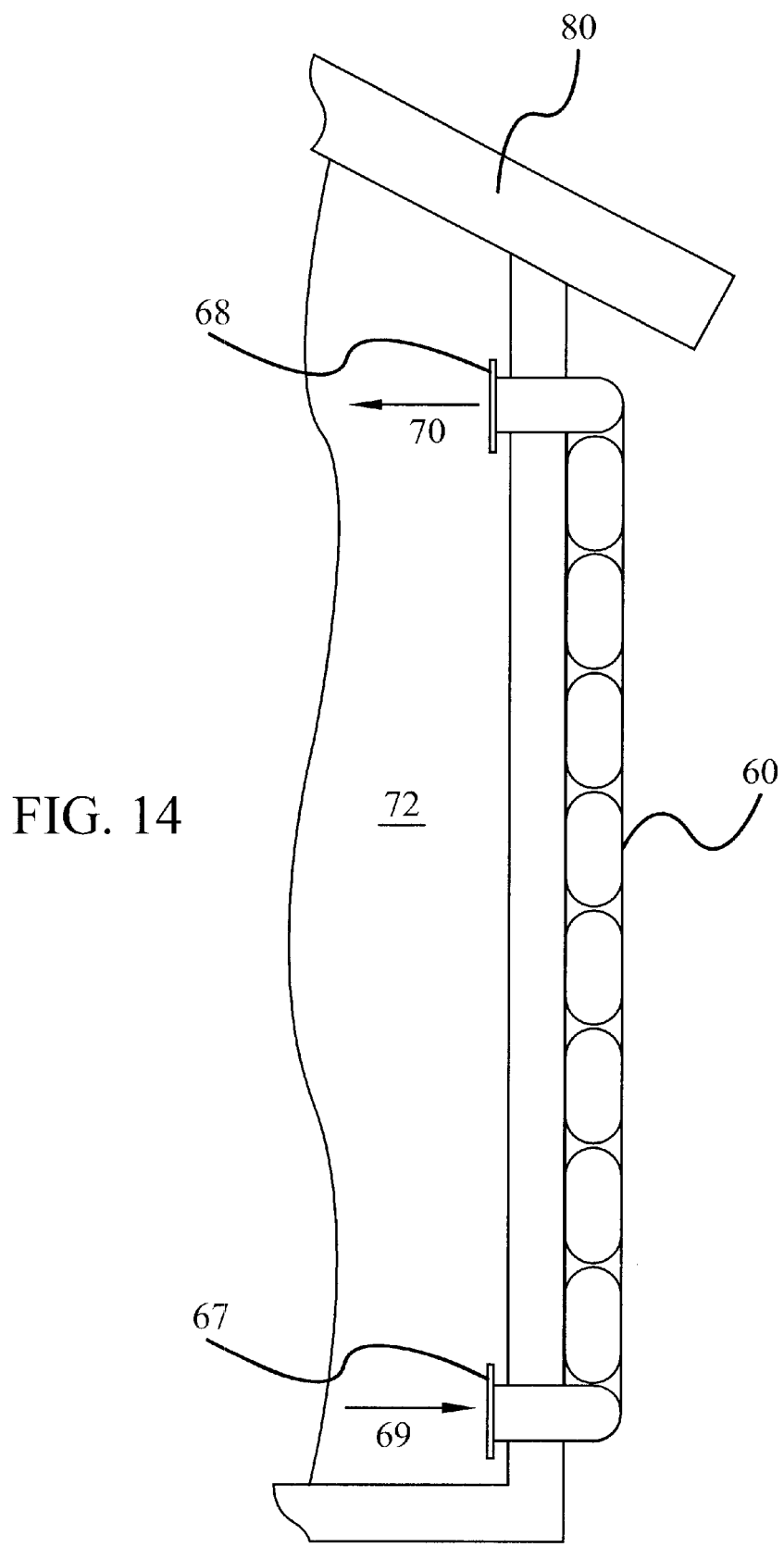
FIG. 14 is a is a side plan view of another solar energy collection system embodiment of the invention mounted on a house in conjunction with a heat circulation system.

Describing the use and installation of solar energy collection system 60 further, reference is made to FIG. 14. In FIG. 14, solar energy collection system 60 is shown in conjunction with a side of house 80. Notwithstanding the foregoing, solar energy collection system 60 may be placed on the roof of house 80, or the roof of any other structure, such as a garage, porch, pool enclosure, and the like to increase the period of time during which solar energy collection system 60 will be exposed to solar energy. Solar energy collection system 60 is coupled to a heating system including inlet air vent 67 and outlet air vent 70. Heated air 70 from solar energy collection system 60 rises convectively and exits through outlet air vent 68. That is, heated air 70 in solar energy collection system 60 will naturally want to rise, effectively both pushing and pulling at cooler air 69 in a circulation pattern through inlet air vent 67, thereby moving heated air 70 from solar energy collection system 60 out into room 72 and conditioning the air therein. Alternatively, a blower, fan, pump, or the like may be incorporated into the heating system to circulate cooler air 69 and heated air 70 through solar energy collection system 60 in a circulation pattern, thereby conditioning the air in room 72.

Accordingly, the solar collector pipe of the invention overcomes the aforementioned drawbacks of previous conventional solar heating systems. The solar collector pipe is easy to manufacture and assemble, is easy to maintain and replace damaged components, and is structured of inexpensive materials. In specific embodiments of the invention, a solar collector pipe system may be assembled even more easily than a conventional sprinkler system for example because it has no sprinkler heads. Moreover, the solar collector pipe directly conveys fluid to be heated and collects and transfers solar energy efficiently and directly to the internal fluid, thereby maximizing both the amount of energy transmitted to the internal fluid and the peak temperature attainable by that fluid. Specifically, by providing a transparent portion and a conduit portion (with a reflecting surface thereon) of the solar collector pipe with certain shapes, such as parabolic shapes, solar energy is appropriately directed to the absorbing portion, especially if it is located along a vertical center axis of the solar collector pipe. Thus, fluid within the solar collector pipe may be heated directly by the solar energy transmitted through the transparent portion, as well as by reflected energy from the reflecting surface of the conduit portion and through heat transfer from the heat absorbing portion.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, unless otherwise specified, any components of the present invention indicated in the drawings or herein are given as an example of possible components and not as a limitation. Similarly, unless otherwise specified, any steps or sequence of steps of the method of the present invention indicated herein are given as examples of possible steps or sequence of steps and not as limitations.

What is claimed is:

1. A solar collector pipe for conveying fluid to be heated and for removing heated fluid, the solar collector pipe comprising:
   a transparent portion for admitting solar energy into the solar collector pipe;
   an absorbing portion internal to the solar collector pipe for absorbing solar energy; and
   a conduit portion comprising opposing wall portions on either side of a vertical center axis of the solar collector pipe that together form an ogive shape in cross-section, the opposing wall portions comprising a reflecting surface thereon for reflecting solar energy received through the transparent portion onto the absorbing portion;
      wherein the transparent portion, the conduit portion, and the absorbing portion together define at least one fluid passageway for conveying the fluid.

2. The solar collector pipe of claim 1, wherein the transparent portion is integrally joined to the conduit portion.

3. The solar collector pipe of claim 1, wherein the transparent portion forms an arc shape in cross-section.

4. The solar collector pipe of claim 1, wherein the absorbing portion is on a vertical center axis of the solar collector pipe.

5. The solar collector pipe of claim 1, wherein a lower portion of the absorbing portion contacts the reflecting surface and an upper portion of the absorbing portion contacts the transparent portion.

6. The solar collector pipe of claim 5, wherein the absorbing portion is integrally joined to the transparent portion and the conduit portion.

7. The solar collector pipe of claim 1, wherein an upper portion of the absorbing portion forms one of an I-shape, a T-shape, and a Y-shape.

8. The solar collector pipe of claim 1, wherein the conduit portion further comprises opposing wall portions on either side of a vertical center axis of the solar collector pipe that comprise:
   a locking tab protruding outwardly from a first opposing wall portion; and
   at least one opposing tab slot defined by a second opposing wall portion, wherein
      the at least one opposing tab slot is configured to receive the locking tab of a different solar collector pipe in removable engagement.

9. The solar collector pipe of claim 8, wherein the at least one opposing tab slot comprises a plurality of tab slots configured to receive the locking tab of the different solar collector pipe in removable engagement such that the different solar collector pipe may be positioned to account for a plurality of structural angles.

10. A solar energy collection system comprising at least two solar collector pipes in fluid flow communication with one another for conveying fluid to be heated and for removing heated fluid, the at least two solar collector pipes each comprising:
    a transparent portion for admitting solar energy therethrough;
    an absorbing portion therein for absorbing solar energy; and
    a conduit portion comprising opposing wall portions on either side of a vertical center axis of the solar collector pipe that together form an ogive shape in cross-section, the opposing wall portions comprising a reflecting surface thereon for reflecting solar energy received through the transparent portion onto the absorbing portion;
       wherein the transparent portion, the conduit portion, and the absorbing portion together define at least one fluid passageway for conveying the fluid.

11. The solar energy collection system of claim 10, wherein each transparent portion is integrally joined to each conduit portion.

12. The solar energy collection system of claim 10, wherein each transparent portion forms one of an arc shape, a cambered shape, a parabolic shape, a catenary shape, and a semi-elliptical shape in cross-section.

13. The solar energy collection system of claim 10, wherein each absorbing portion is on a vertical center axis of each of the at least two solar collector pipes.

14. The solar energy collection system of claim 10, wherein a lower portion of each absorbing portion contacts each reflecting surface and an upper portion of each absorbing portion contacts each transparent portion.

15. The solar energy collection system of claim 14, wherein each absorbing portion is integrally joined to each transparent portion and each conduit portion.

16. The solar energy collection system of claim 10, wherein an upper portion of each absorbing portion forms one of an I-shape, a T-shape, and a Y-shape.

17. The solar energy collection system of claim 10, wherein each conduit portion further comprises opposing wall portions on either side of a vertical center axis of each of the at least two solar collector pipes, wherein the opposing wall portions of each conduit portion comprise:
   a locking tab protruding outwardly from a first opposing wall portion; and
   at least one opposing tab slot defined by a second opposing wall portion, wherein
      the at least one opposing tab slot is configured to receive the locking tab of a different solar collector pipe in removable engagement.

18. The solar energy collection system of claim 17, wherein the at least one opposing tab slot comprises a plurality of tab slots configured to receive the locking tab of the different solar collector pipe in removable engagement such that the different solar collector pipe may be positioned to account for a plurality of structural angles.

19. The solar energy collection system of claim 10 further comprising at least one mounting bracket for removably mounting the at least two solar collector pipes against a structure.

20. The solar energy collection system of claim 19, wherein the at least one mounting bracket is positioned at one of a 22.5° angle and a 45° angle from a horizontal lower axis of the at least one mounting bracket.

21. The solar energy collection system of claim 19, wherein the at least one mounting bracket is adjustable between a plurality of angles.

22. The solar energy collection system of claim 10 further comprising at least one pipe connector for connecting the at least two solar collector pipes together in fluid flow communication.

23. The solar energy collection system of claim 19, wherein the at least one pipe connector is for connecting one of the at least two solar collector pipes together with a cylindrical pipe in fluid flow communication.

24. The solar energy collection system of claim 10, wherein the at least two solar collector pipes comprise a plurality of solar collector pipes.

25. The solar energy collection system of claim 24, wherein the plurality of solar collector pipes are integrally joined together in a fixed immovable relationship relative to each other in a unitary body.

26. The solar energy collection system of claim 10 further comprising a thermal storage device in fluid flow communication with the at least two solar collector and configured to store heated fluid.

27. The solar energy collection system of claim 10 further comprising a heat circulation system in fluid flow communication with the at least two solar collector pipes and configured to circulate heat in an area.

28. The solar energy collection system of claim 10 further comprising a pump in fluid flow communication with the at least two solar collector pipes and configured to circulate fluid through the at least two solar collector pipes.

29. A solar collector pipe for conveying fluid to be heated and for removing heated fluid, the solar collector pipe comprising:
   a fluid conduit comprising:
      a transparent portion on an external surface of the fluid conduit, the transparent portion having a first end and a second end and forming one of an arc shape, a cambered shape, a parabolic shape, a catenary shape, and a semi-elliptical shape in cross-section;
      a conduit portion comprising a first opposing wall having a first end coupled to the first end of the transparent portion and a second opposing wall having a first end coupled to the second end of the transparent portion, the first and second opposing walls each having second ends joined together and together forming one of an ogive shape, a dropped ogive shape, an equilateral ogive shape, and a lancet ogive shape in cross-section about either side of a vertical center axis of the solar collector pipe, the opposing walls comprising a reflecting surface thereon for reflecting solar energy received through the transparent portion toward the vertical center axis of the solar collector pipe; and
      an absorbing portion internal to the fluid conduit and extending along the center vertical axis for at least a portion of its extent.

30. The solar collector pipe of claim 29, wherein the absorbing portion extends along the vertical center axis from the joined second ends of the opposing walls.

31. The solar collector pipe of claim 29, wherein the absorbing portion extends from at least one reflective surface to the transparent portion.

32. The solar collector pipe of claim 29, wherein the absorbing portion extends from the joined second ends of the opposing walls along the vertical center axis forming an I-shape.

33. The solar collector pipe of claim 29, wherein the absorbing portion extends from the joined ends of the opposing walls along the vertical center axis forming a Y-shape.

34. The solar collector pipe of claim 29, wherein the absorbing portion extends from the joined second ends of the opposing walls along the vertical center axis forming a T-shape.

35. The solar collector pipe of claim 29, wherein the absorbing portion extends from the joined second ends of the opposing walls along the vertical center axis and ends before it reaches either the transparent surface or any other portion of either opposing wall.

36. A solar energy collection system for conveying liquid to be heated and for removing heated liquid, the solar energy collector system comprising:
   first and second liquid conduits each comprising:
      a transparent portion on an external surface, the transparent portion having a first end and a second end;
      a first opposing wall having a first end coupled to the first end of the transparent portion;
      a second opposing wall having a first end coupled to the second end of the transparent portion;
         wherein the first and second opposing walls are joined together at respective second ends, together forming an ogive shape in cross-section about either side of a vertical center axis, and wherein each of the first and second opposing walls comprise a reflective surface thereon configured to reflect solar energy received through the transparent portion toward the vertical center axis; and
      an absorbing portion extending within the cross-section along the center vertical axis for at least a portion of its extent;

wherein the first and second liquid conduits are located substantially parallel to each other and are coupled in fluid communication at first respective ends such that fluid passing through the first liquid conduit thereafter passes through the second liquid conduit.

37. The solar energy collection system of claim 36, wherein the transparent portion of each of the first and second liquid conduits forms an arc shape in cross-section between the first and second ends of the transparent portion.

38. The solar energy collection system of claim 36, wherein the absorbing portion of each of the first and second liquid conduits extends along the vertical center axis in cross-section from the joined second ends of the opposing walls.

39. The solar energy collection system of claim 36, wherein the absorbing portion of each of the first and second liquid conduits extends from at least one reflective surface to the transparent portion.

40. The solar energy collection system of claim 36, wherein the absorbing portion extends from the joined second ends of the opposing walls along the vertical center axis forming an I-shape in cross-section.

41. The solar energy collection system of claim 36, wherein the absorbing portion extends from the joined second ends of the opposing walls along the vertical center axis forming a Y-shape in cross-section.

42. The solar energy collection system of claim 36, wherein the absorbing portion extends from the joined second ends of the opposing walls along the vertical center axis forming a T-shape in cross-section.

43. The solar energy collection system of claim 36, wherein the absorbing portion extends from the joined second ends of the opposing walls along the vertical center axis in cross-section and ends before it reaches either the transparent surface or any other portion of either opposing wall.

* * * * *

UNITED STATES PATENT AND TRADEMARK OFFICE
CERTIFICATE OF CORRECTION

PATENT NO.    : 6,604,521 B2                                          Page 1 of 1
DATED         : August 12, 2003
INVENTOR(S)   : Smith et al.

It is certified that error appears in the above-identified patent and that said Letters Patent is hereby corrected as shown below:

Column 14,
Line 59, should read as follows:
-- The solar energy collection system of claim 10, wherein each transparent portion forms an arc shape in cross-section. --

Column 29,
Line 65, should read as follows:
-- A solar collector pipe for conveying fluid to be heated and for removing heated fluid, the solar collector pipe comprising:
a fluid conduit comprising:
   a transparent portion on an external surface of the fluid conduit, the transparent portion having a first end and a second end forming an arc shape in cross-section;
   a conduit portion comprising a first opposing wall having a first end coupled to the first end of the transparent portion and a second opposing wall having a first end coupled to the second end of the transparent portion, the first and second opposing walls each having second ends joined together and together forming an ogive shape in cross-section about either side of a vertical center axis of the solar collector pipe, the opposing walls comprising a reflecting surface thereon for reflecting solar energy received through the transparent portion toward the vertical center axis of the solar collector pipe; and
   an absorbing portion internal to the fluid conduit and extending along the center vertical axis for at least a portion of its extent. --

Signed and Sealed this

Thirteenth Day of January, 2004

JAMES E. ROGAN
*Director of the United States Patent and Trademark Office*